US007300020B2

(12) United States Patent
Steiner et al.

(10) Patent No.: US 7,300,020 B2
(45) Date of Patent: Nov. 27, 2007

(54) SYSTEMS AND METHODS FOR BRAKING AIRCRAFT, INCLUDING BRAKING INTERMEDIATE MAIN GEARS AND DIFFERENTIAL BRAKING

(75) Inventors: David S. Steiner, Seattle, WA (US); Richard D. Vandervoort, Seattle, WA (US)

(73) Assignee: The Boeing Company, Chicago, IL (US)

( * ) Notice: Subject to any disclaimer, the term of this patent is extended or adjusted under 35 U.S.C. 154(b) by 110 days.

(21) Appl. No.: 11/067,053

(22) Filed: Feb. 24, 2005

(65) Prior Publication Data

US 2007/0252036 A1    Nov. 1, 2007

Related U.S. Application Data

(63) Continuation of application No. 11/064,615, filed on Feb. 23, 2005.

(51) Int. Cl.
*B64C 25/48* (2006.01)
(52) U.S. Cl. ...................................... 244/111
(58) Field of Classification Search ................ 244/111;
188/71.1, 196 R, 382; 303/3, 20, 9.61, 93,
303/14, 15, 9.62, 111, 126, 122.09
See application file for complete search history.

(56) References Cited

U.S. PATENT DOCUMENTS

| 2,794,609 A | 6/1957 | Perry |
| 3,520,575 A | 7/1970 | Steigerwald |
| 3,537,551 A | 11/1970 | Serra |

(Continued)

FOREIGN PATENT DOCUMENTS

DE    555392    7/1932

(Continued)

OTHER PUBLICATIONS

PCT Application No. PCT/US2006/006009, Applicant: The Boeing Company. Date of Mailing: Jul. 7, 2006, 7 pages.

(Continued)

*Primary Examiner*—Timothy D. Collins
(74) *Attorney, Agent, or Firm*—Perkins Coie LLP

(57) ABSTRACT

Systems and methods for braking aircraft are disclosed. These systems and methods can be employed on multi-main gear aircraft to reduce the radius with which the aircraft makes low speed, pivot turns. Further systems and methods can be used to correct the braking behavior of the aircraft during a turn when the actual or measured braking behavior of the aircraft deviates from the commanded turning behavior. For example, one system includes a controller operatively coupleable amongst a leftmost landing gear, a rightmost landing gear, and an intermediate landing gear of an aircraft. The controller can be configured to direct the application of brakes on wheels of the leftmost landing gear during a left turn, and direct the release of brakes on all wheels of the intermediate landing gear during the left turn. Another system includes a controller coupleable to left and right aircraft brakes, and is configured to receive a first signal corresponding to a commanded turn behavior, a second signal corresponding to an actual turn behavior, and, in response to an error value (based on the first and second signals) exceeding a threshold value, the controller can direct a change in braking force applied to at least one of the left and right aircraft brakes.

17 Claims, 11 Drawing Sheets

U.S. PATENT DOCUMENTS

| | | |
|---|---|---|
| 3,776,333 A | 12/1973 | Mathauswer |
| 3,926,479 A | 12/1975 | Bissell et al. |
| 3,948,569 A | 4/1976 | Gentet |
| 3,993,174 A | 11/1976 | Williams et al. |
| 4,006,941 A | 2/1977 | DeVlieg |
| 4,007,970 A | 2/1977 | Romero |
| 4,008,868 A | 2/1977 | Berg |
| 4,076,331 A | 2/1978 | DeVlieg |
| 4,180,223 A | 12/1979 | Amberg |
| 4,195,803 A | 4/1980 | Faure |
| 4,205,735 A | 6/1980 | Murray |
| 4,221,350 A | 9/1980 | Moser |
| 4,402,478 A | 9/1983 | Martin |
| 4,430,715 A | 2/1984 | Gentet |
| 4,482,961 A | 11/1984 | Kliner et al. |
| 4,500,589 A | 2/1985 | Schijve |
| 4,591,213 A | 5/1986 | Rapoport |
| 4,646,242 A | 2/1987 | Valaas |
| 4,818,036 A | 4/1989 | Reinecke et al. |
| 4,923,056 A | 5/1990 | Nedelk |
| 4,935,291 A | 6/1990 | Gunnink |
| 4,986,610 A | 1/1991 | Beck |
| 4,992,323 A | 2/1991 | Vogelesang |
| 5,039,566 A | 8/1991 | Skubic |
| 5,160,771 A | 11/1992 | Lambing |
| 5,417,477 A | 5/1995 | Lasbleis |
| 5,429,326 A | 7/1995 | Garesche |
| 5,547,735 A | 8/1996 | Roebroeks |
| 5,615,934 A | 4/1997 | Abuelsamid |
| 5,665,450 A | 9/1997 | Day |
| 6,398,162 B1 | 6/2002 | Stimson et al. |
| 6,478,252 B1 | 11/2002 | Stimson |
| 6,604,708 B1 | 8/2003 | De Vlieg |
| 6,663,192 B2 | 12/2003 | Bourguet et al. |
| 6,820,946 B2 | 11/2004 | Salamat et al. |
| 6,851,461 B2 | 2/2005 | McNicol et al. |
| 6,851,649 B1 | 2/2005 | Radford |
| 6,938,857 B2 | 9/2005 | DeVlieg |
| 7,165,816 B2 | 1/2007 | DeVlieg |
| 2004/0065776 A1 | 4/2004 | DeVlieg |
| 2005/0231031 A1 | 10/2005 | Bellouard et al. |

FOREIGN PATENT DOCUMENTS

| | | |
|---|---|---|
| DE | 1756129 | 2/1970 |
| FR | 951950 | 11/1949 |
| GB | 1201660 | 8/1970 |

OTHER PUBLICATIONS

Lin Hongy et al., "Optical and Mechanical Properties of Optically Transparent Poly(methyl methacrylate) Composites", Polymer Engineering and Science, Mar. 1992, vol. 32, No. 5, pp. 344-350.

Lin, H. et al., "Temperature and wavelength dependent transmission of optically transparent glass fibre poly (methyl methacrylate) composites", Journal of Material Science 29 (1994), pp. 5193-5198, Chapman Hall.

Lin, Hongy et al., "Aging Behavior of Optically Transparent Poly (Methyl Methacrylate) Composites", Polymer Compsites, Oct. 1993, vol. 11, No. 5, pp. 402-409.

Lin, Hongy et al., "Model for the temperature dependent transmission of optically transparent poly (methyl methacrylate) composites", Journal of Material Research, (Feb. 1993), vol. 8 No. 2, pp. 364-370, Materials Research Society.

Lin, Hongy et al., "The Effect of Fiber Annealing on the Properties of an Optically Transparent PMMA Composite", Composites Science and Technology 50 (1994) pp. 367-372, Elseiver Science Publishers Ltd.

Milewski, et al., "Physical Properties of Glass Ribbon", Handbook of Reinforcements for Plastics, Van Nostrand Reinhold Co. 1987.

Olson, James R., "Fabrication and Mechanical Properties of an Optically Transparent Glass Fiber/Polymer Matrix Composite," Journal of Composite Materials, pp. 1181-1192, vol. 26, No. 8, (1992) Technome Publishing Co.

Weaver, Kevin D. et al., "Preparation and Properties of Optically Transparent, Pressure-Cured Poly (Methyl Methacrylate) Composites", Polymer Composites, Dec. 1993, vol. 14, No. 5, pp. 515-523.

Weaver, Kevin D., Interfacial Bonding and Optical Transmission for Transparent Fiberglass/Poly (Methyl Methacrylate) Composites, Polymer Composites, Apr. 1995, vol. 16, No. 2, pp. 161-169.

Fig. 1A

SYSTEMS AND METHODS FOR BRAKING AIRCRAFT, INCLUDING BRAKING INTERMEDIATE MAIN GEARS AND DIFFERENTIAL BRAKING

CROSS-REFERENCE TO RELATED APPLICATION

This application is a continuation of U.S. patent application Ser. No. 11/064,615, filed Feb. 23, 2005, which is hereby incorporated by reference in its entirety.

TECHNICAL FIELD

The present invention is directed generally toward systems and methods for braking aircraft, including braking intermediate main landing gears and differentially braking any gear.

BACKGROUND

Large transport aircraft, both military and commercial, typically include a main landing gear arrangement that supports most of the aircraft weight, along with a nose gear for stability and steering. The main landing gear usually includes at least two posts, each of which carries a truck. Each truck carries multiple wheels, and each wheel includes one or more brakes. Larger aircraft typically include a left main gear, a right main gear, and one or more intermediate main gears between the left and right gears. The wheels of the left and right gears include brakes, and in some cases, the wheels of the intermediate gears also include brakes. For example, the MD-11 aircraft includes a single intermediate post with wheels having brakes that are mechanically linked to the brakes of the left and right posts. The wheels of the intermediate gear can be braked at a level between that applied to the left post wheels and that applied to the right post wheels. The nose gear is typically unbraked, so as not to interfere with aircraft steering, and because the nose gear carries only a small fraction of the aircraft weight.

The stopping distance of an aircraft depends primarily on aircraft weight and braking effectiveness. As transport aircraft increase in size, there has been continual pressure on manufacturers to increase braking effectiveness. While the current systems described above are adequate for braking current aircraft, it may be desirable to further increase braking effectiveness, both for current generation aircraft and larger, next generation aircraft. Furthermore, it may be desirable to reduce the turning radius of aircraft, so as to allow the aircraft to use smaller and/or more crowded airport spaces.

SUMMARY

The following summary is provided for the benefit of the reader only, and does not limit the invention as set forth by the claims. The present invention is directed generally toward systems and methods for braking aircraft, including braking intermediate main gear wheels on aircraft, and also differentially braking aircraft wheels. A system in accordance with one aspect of the invention includes a controller that is operatively coupleable among a left-most landing gear of an aircraft, a right-most landing gear of the aircraft, and an intermediate landing gear of the aircraft. The intermediate landing gear of the aircraft is positioned aft of a nose wheel of the aircraft, between the left-most landing gear and the right-most landing gear. During a left turn, the controller can be configured to direct the application of brakes on wheels of the left-most landing gear, and direct the release of brakes on all wheels of the intermediate gear.

A braking system in accordance with another aspect of the invention includes a controller operatively coupleable among a left-most landing gear of an aircraft, a right-most landing gear of the aircraft, a left intermediate landing gear, and a right intermediate landing gear. The controller can be configured to direct the application of brakes on wheels of the left intermediate landing gear during a left turn, and direct the release of brakes on wheels of the left-most landing gear during the left turn. Accordingly, this system can permit tight turns by the aircraft.

A system in accordance with still another aspect of the invention includes a controller operatively coupleable with a non-mechanical link to a left-most landing gear, a right-most landing gear and at least one intermediate landing gear of an aircraft. The controller can be configured to direct a first braking force to wheels of the left-most landing gear during a left turn, and no braking force or a second braking force less than the first braking force to wheels of the right-most landing gear during the left turn. The controller can further be configured to direct a third braking force to the intermediate gear, with the third braking force less than the first braking force and greater than the second braking force if the second force is non-zero. The third braking force can be zero if the second braking force is zero.

A braking system in accordance with still another aspect of the invention includes a controller that is coupleable to left and right aircraft brakes and is configured to receive a first signal corresponding to a commanded turn behavior and a second signal corresponding to an actual or measured turn behavior. The controller can be configured to determine an error value based on the first and second signals and, in response to the error value exceeding a threshold value, can direct a change in braking force applied to at least one of the left and right aircraft brakes.

BRIEF DESCRIPTION OF THE DRAWINGS

FIGS. 1A and 1B illustrate a top isometric view and a top plan view, respectively, of an aircraft having a braking system, configured in accordance with an embodiment of the invention.

DETAILED DESCRIPTION

The present disclosure describes systems and methods for braking aircraft, including but not limited to (a) braking wheels carried by the center post or other intermediate main landing gear of the aircraft, (b) supporting sharp "pivot" turns, (c) differentially braking left and right gears to account for external effects, and/or (d) differentially braking right and left wheels of a given landing gear truck. Certain specific details are set forth in the following description and in FIGS. 1A-10B to provide a through understanding of various embodiments of the invention. Well-known structures, systems and methods often associated with the systems have not been shown or described in detail to avoid unnecessarily obscuring the description of the various embodiments of the invention. In addition, those of ordinary skill in the relevant art will understand that additional embodiments of the invention may be practiced without several of the details described below.

Many embodiments of the invention described below may take the form of computer-executable instructions, including routines executed by a programmable computer. Those skilled in the relevant art will appreciate that the invention can be practiced on computer systems other than those shown and described below. The invention can be embodied in a special-purpose computer or data processor that is specifically programmed, configured or constructed to perform one or more of the computer-executable instructions described below. Accordingly, the term "computer" as generally used herein refers to any data processor and can include Internet appliances and handheld devices (including palm-top computers, wearable computers, cellular or mobile phones, multi-processor systems, processor-based or programmable consumer electronics, network computers, minicomputers and the like). Information handled by these computers can be presented at any suitable display medium, including a CRT display or LCD.

The invention can also be practiced in distributed environments, where tasks or modules are performed by remote processing devices that are linked through a communications network. In a distributed computing environment, program modules or subroutines may be located in local and remote memory storage devices. Aspects of the invention described below may be stored or distributed on computer-readable media, including magnetic or optically readable or removable computer disks, as well as distributed electronically over networks. Data structures and transmissions of data particular to aspects of the invention are also encompassed in the scope of the invention.

Figure 1A:
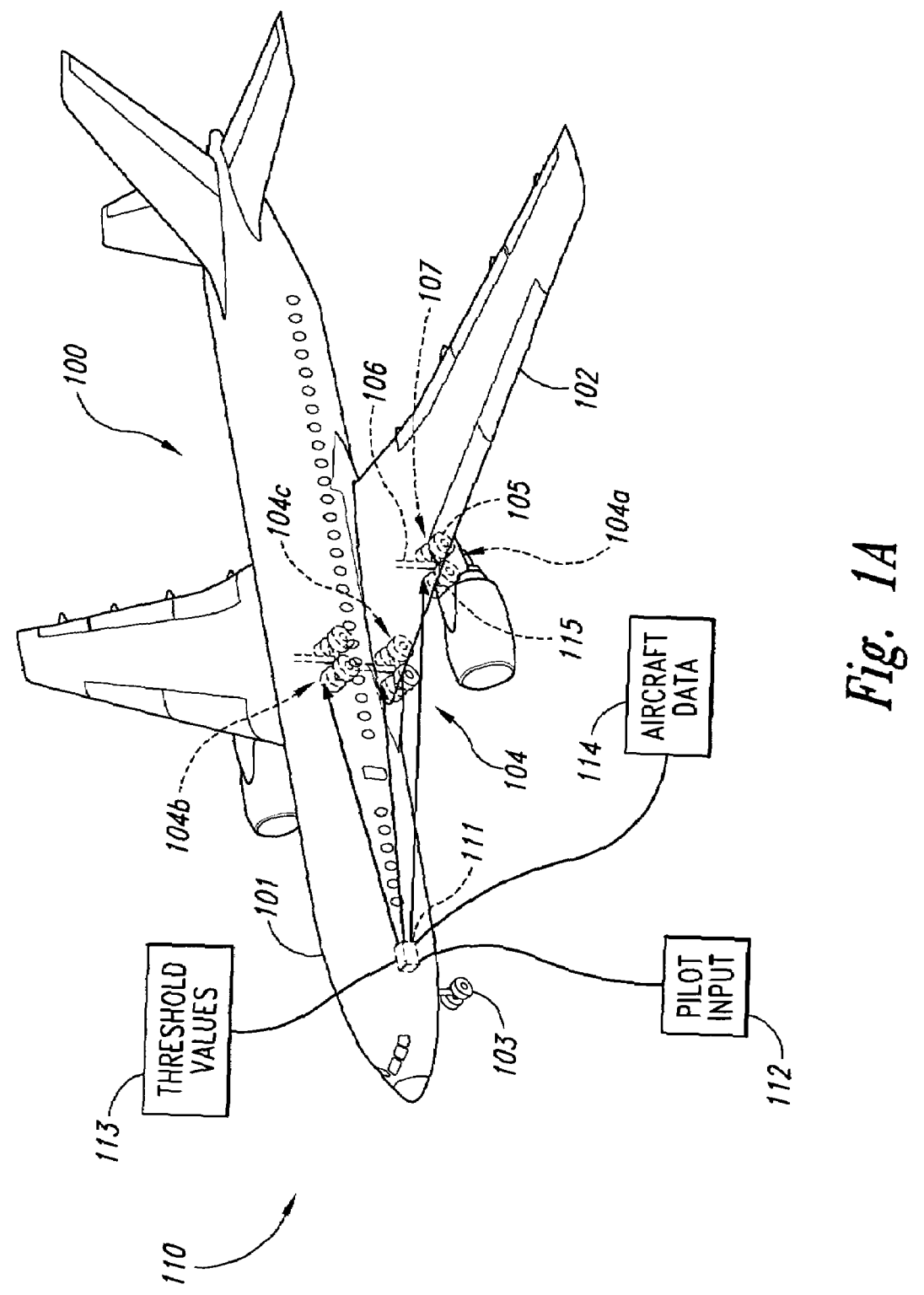
Figure 1B:
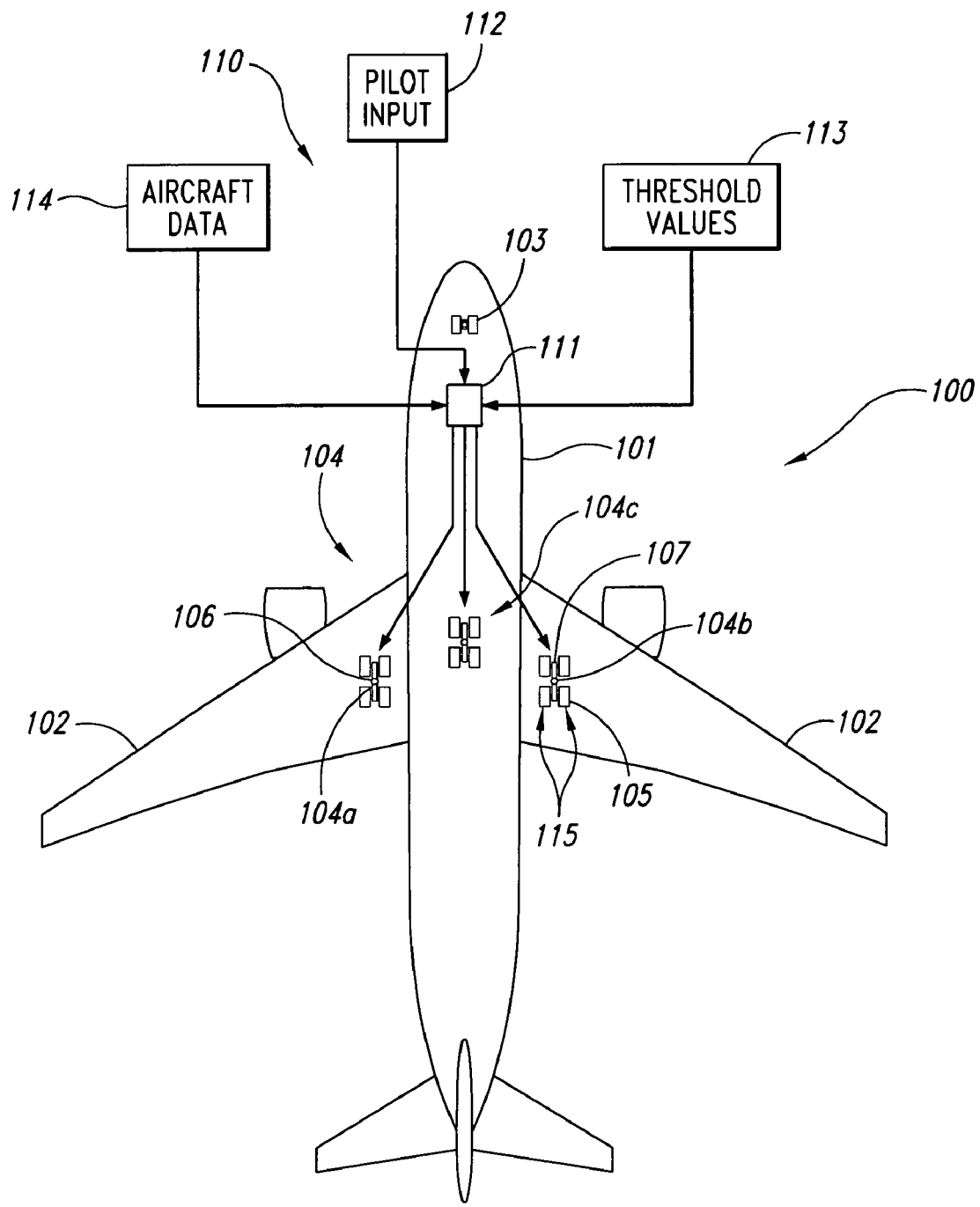

FIGS. 1A and 1B illustrate an isometric view and plan view, respectively, of an aircraft 100 having a brake system 110 configured in accordance with an embodiment of the invention. The aircraft 100 can include a fuselage 101 and wings 102 coupled to the fuselage 101 at a wing-body junction. The aircraft 100 can be supported at multiple points via a forward nose gear 103 and main landing gear 104. The main gear 104 can include a left gear 104a, a right gear 104b, and a center or intermediate gear 104c. The intermediate gear 104c can be positioned aft of the nose gear 103 and laterally between the left gear 104a and the right gear 104b. The intermediate gear 104c can be positioned directly between the left gear 104a and the right gear 104b, or it can be longitudinally offset from a lateral axis extending between the left gear 104a and the right gear 104b. Each main gear 104 can include a post 106 carrying a truck 107, and the truck 107 can include multiple wheels 105 that are selectively or collectively braked to reduce the speed of the aircraft 100 during taxi maneuvers and post-landing rollout.

The brake system 110 can include brakes 115 located at each of the wheels 105, and a controller 111 coupled to the brakes 115. The controller 111 can direct the application of various combinations of brakes 115, depending upon one or more aircraft characteristics or parameters, as will be discussed in greater detail below. The controller 111 can also disable braking of selected brakes 115, also depending upon these characteristics or parameters. Accordingly, the controller 111 can receive pilot inputs 112 (e.g., command signals received via brake pedals at the flight deck of the aircraft 100), threshold values 113, and aircraft data 114. In particular embodiments of the invention, the aircraft data 114 are compared with the threshold values 113 to determine which brakes to apply and which brakes to inhibit, as is also described in greater detail below.

Figure 2:
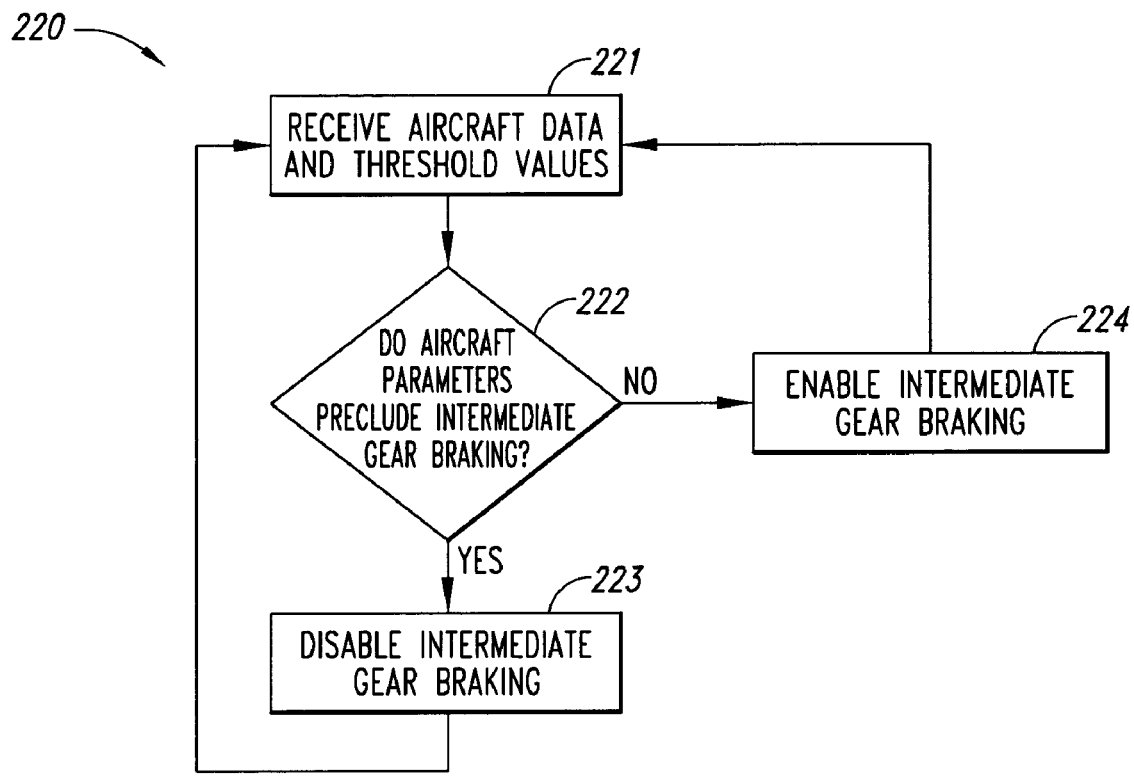
FIG. 2 illustrates a flow diagram corresponding to a method for braking aircraft in an accordance with an embodiment of the invention.

FIG. 2 is a flow diagram illustrating a process 220 for braking an aircraft in accordance with an embodiment of the invention. In one aspect of this embodiment, the process 220 can include in process portion 221 receiving aircraft data (corresponding to aircraft parameters) and threshold values. The aircraft parameters and threshold values can be compared with each other to determine whether the aircraft parameters preclude braking at the intermediate landing gear (e.g., at the intermediate gear 104c described above with reference to FIGS. 1A and 1B). If the aircraft parameters preclude braking at the intermediate gear, the process includes disabling intermediate gear braking (process portion 223). If not, the process can include enabling intermediate gear braking (process portion 224). The foregoing process can be repeated continually during a braking event, and/or re-initiated each time a new brake command is initiated. In one aspect of this embodiment, the intermediate gear braking can be enabled as a default (e.g., the intermediate gear braking can be enabled unless the system instructs otherwise). In other embodiments, the intermediate gear braking can default to a disabled setting. In either of these embodiments, the decision to enable or disable intermediate gear braking can be made on the basis of one or more aircraft parameters, as described further below with reference to FIG. 3.

Figure 3:
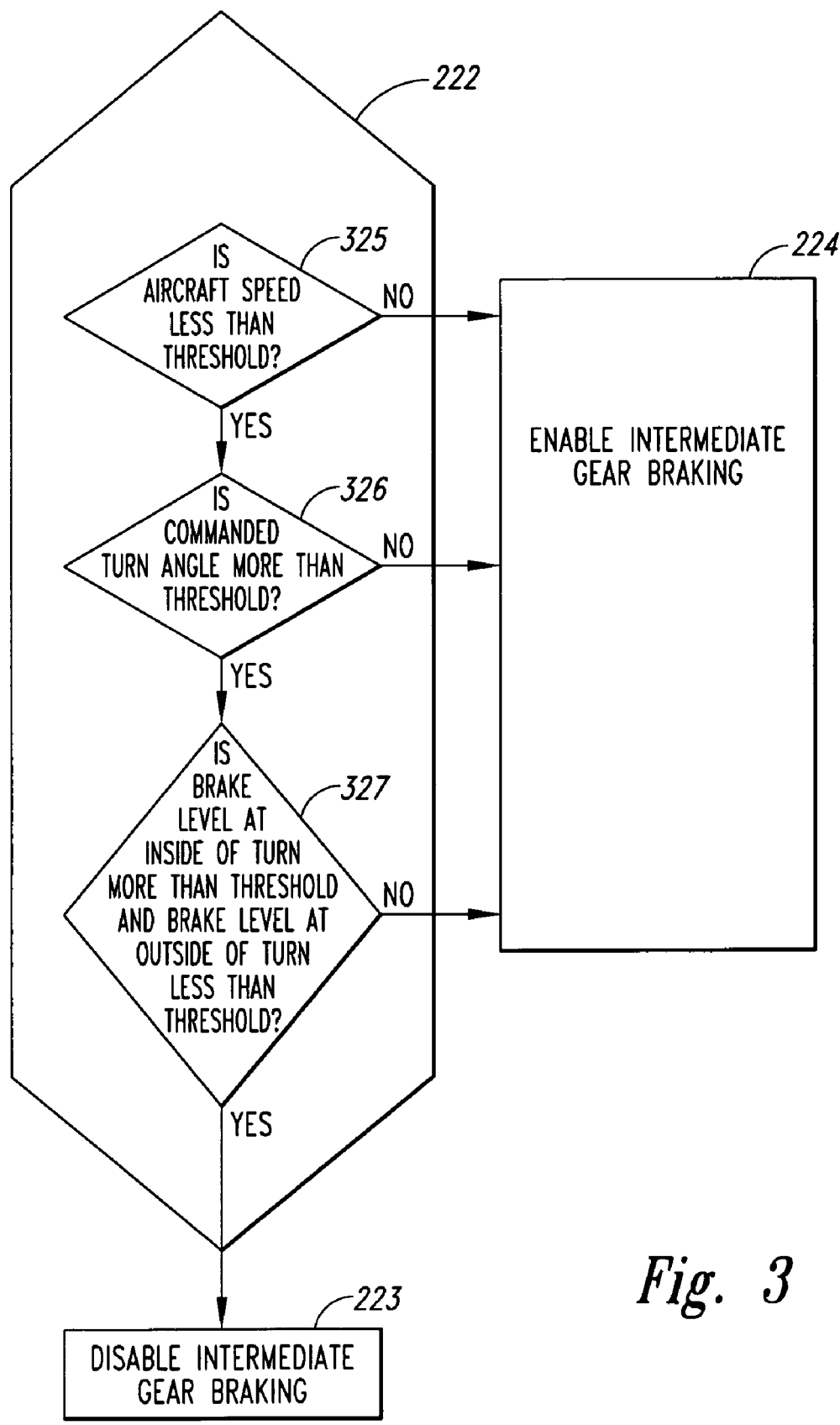
FIG. 3 illustrates further details of a method for braking one or more intermediate landing gears of an aircraft, in accordance with an embodiment of the invention.

Referring now to FIG. 3, block 222 (determining whether aircraft parameters preclude intermediate gear braking or not) can include a comparison between (a) one or more pieces of data associated with a current state of the aircraft, and (b) a corresponding, pre-established threshold value. For example, in block 325, the process 220 can include determining whether the aircraft speed is less than a threshold speed. If the aircraft speed is less than the threshold speed, then the intermediate gear braking can be disabled. If the aircraft speed is above the threshold speed, then intermediate gear braking can be enabled. In a particular embodiment, the threshold speed can be set above a typical taxi speed. Accordingly, when the aircraft is on a post-landing rollout, and a significant amount of braking force is required to reduce aircraft speed, the intermediate gear braking can be enabled to increase overall aircraft braking effectiveness. Conversely, when the aircraft is engaged in taxi maneuvers during which large braking forces are not typically required, but during which it may be important to pivot the aircraft through tight radius turns, the intermediate gear braking may be inhibited. Details of further arrangements for enhancing the ability of the aircraft to make tight radius turns are described below with reference to FIGS. 4 and 5.

As discussed above, it may be desirable to inhibit or disable intermediate gear braking when the aircraft is commanded to make a relatively tight radius turn. Accordingly, in process portion 326, the process can include determining whether a commanded turn angle is above a threshold value. The commanded turn angle can correspond to the amount by which the orientation of the nose gear differs from a straight-ahead course. If the commanded turn angle is above a threshold value, the intermediate gear braking can be disabled. If not, the intermediate gear braking can be enabled (or can remain enabled).

Another factor that can indicate that the aircraft is going through a tight radius turn includes the presence of a different braking force applied to one side of the aircraft than to the other (e.g., via different pressures applied to right and left brake pedals). Accordingly, process portion 327 can include determining whether the brake level at the inside of a commanded turn is more than a threshold level and whether the brake level at the outside of the commanded turn is less than the threshold level. For example, if the aircraft is making a tight left turn, the pilot will command a significant braking force at the left pedal, and a less significant or zero braking force at the right pedal. In this case, the intermediate gear braking will be disabled. Conversely, if the pilot makes a gentle turn during landing rollout by providing heavy braking force commands at both pedals, and with one braking force command only slightly less than the other, the condition tested at block 327 will not be met and intermediate gear braking will be enabled.

In one aspect of an embodiment described above with reference to FIG. 3, all three of the criteria identified in blocks 325, 326 and 327 can be tested prior to determining whether to enable or disable the intermediate gear braking. In other embodiments, one or more of these criteria can be eliminated, and in still further embodiments, additional criteria can be used. In yet further embodiments, the intermediate gear braking can remain enabled at all aircraft conditions.

One feature of embodiments of the braking system described above with reference to FIGS. 1A-3 is that they can apply brakes to the intermediate main gear 104c. An advantage of this feature is that it can increase the braking effectiveness of aircraft having such gear. Accordingly, such aircraft can stop in a reduced distance when compared with aircraft that do not have intermediate gear braking.

Another feature of embodiments of the braking system described above with reference to FIGS. 1A-3 is that the intermediate gear braking can be selectively enabled and/or disabled, e.g., in an automated process. An advantage of this feature is that the intermediate gear braking can be automatically enabled when large braking forces are required (e.g., during landing rollout) and can be automatically inhibited when such forces are not necessary, and/or when such forces may reduce braking performance (e.g., when making sharp turns).

Figure 4:
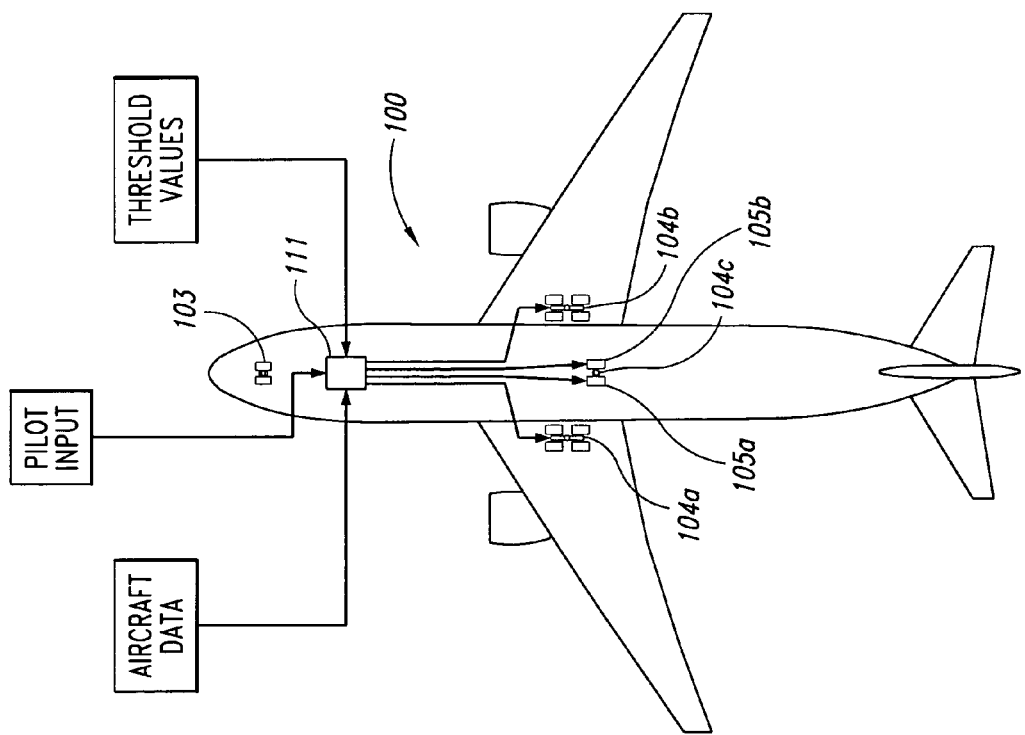
FIG. 4 is a top plan view of an aircraft having a controller configured to differentially brake right and left wheels of a landing gear in accordance with an embodiment of the invention.

FIG. 4 illustrates the aircraft 100, including the left gear 104a, the right gear 104b, and the intermediate gear 104c. The intermediate gear 104c can include one or more left wheels 105a and right wheels 105b. The controller 111 can be coupled to each wheel and can selectively engage or disengage braking on those wheels to improve braking performance. For example, when the aircraft 100 is commanded to make a left turn, the controller 111 can selectively brake the left gear 104a and the left wheel 105a of the intermediate gear 104c, while inhibiting or disabling braking of the right wheel 105b of the intermediate gear 104a, and inhibiting or disabling braking of all the wheels of the right gear 104b. This arrangement can provide some additional braking effect, although the effective pivot point for the turn will shift inwardly toward the aircraft centerline. Accordingly, this braking behavior may be suitable for gentle turns during heavy braking. For sharp turns at low speed, the brakes on all wheels of the intermediate gear 104c can be disabled (as described above), allowing the aircraft 100 to pivot about the left or right gear 104a, 104b. In this case, the system may brake wheels on only one side of the gear to make a small reduction in pivot turning radius, provided the brake force on the reduced number of wheels is sufficient.

Figure 5:
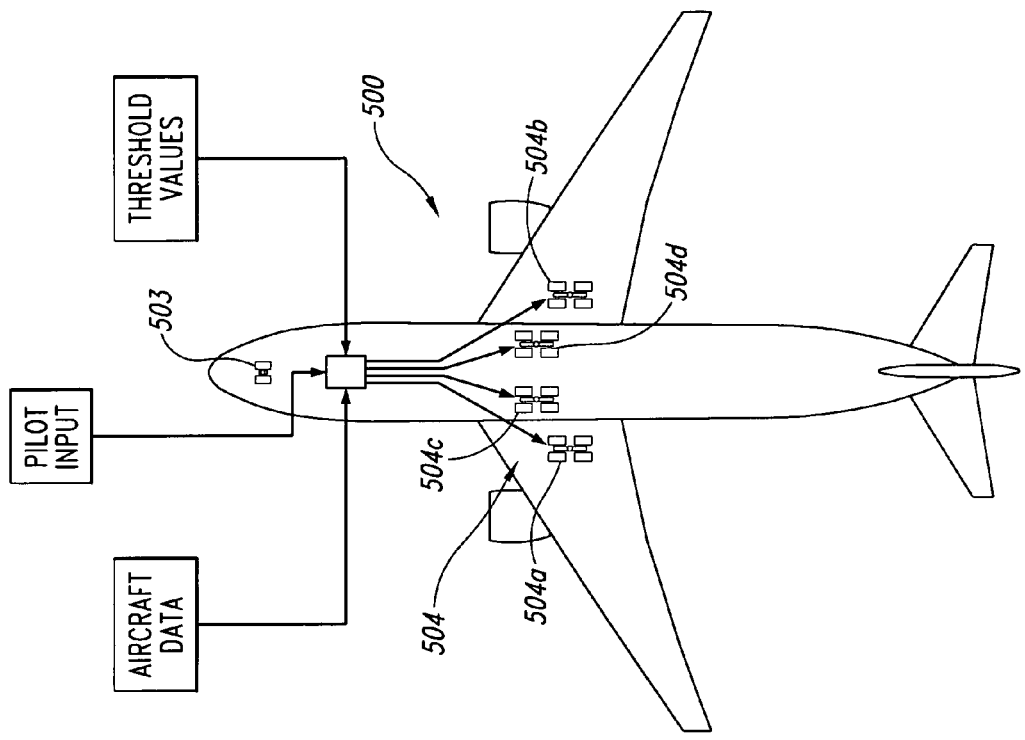
FIG. 5 is a top plan view of an aircraft having multiple intermediate landing gears braked in accordance with an embodiment of the invention.

In the embodiments described above with reference to FIGS. 1A-1B and 4, the aircraft 100 includes a single intermediate landing gear 104c. In other embodiments, including one shown in FIG. 5, an aircraft 500 can include multiple intermediate landing gears. For example, the aircraft 500 can include main gear 504 positioned aft of a nose gear 503, with the main gear 504 including a left gear 504a, a right gear 504b and two intermediate gears (shown as a left intermediate gear 504c and a right intermediate gear 504d). In other embodiments, the aircraft 500 can include additional intermediate gears, depending on factors that include the size of the aircraft and the weight capabilities of the runways on which the aircraft is intended to operate. In any of these embodiments, the intermediate gears can be controlled in accordance with any of the embodiments described above with reference to FIGS. 1A-4. In a particular embodiment, when the appropriate conditions for a pivot turn are met, brakes can be applied only to one of the intermediate gears and not to the other intermediate gear or to the left and right gears. Accordingly, this is an example of disabling (though only partially) intermediate gear braking, as shown in block 223 of FIG. 3. For example, if the aircraft 500 is commanded to make a left pivot turn, brakes can be applied to the left intermediate gear 504c, but not to the right intermediate gear 504d or the left gear 504a or the right gear 504b. Accordingly, the aircraft 500 will pivot about the left intermediate gear 504c and the wheels of the left gear 504a will roll backwards. Using this approach, the aircraft 500 can make a tighter pivot turn than it could if only the left gear 504a were braked, or if both the left gear 504a and the left intermediate gear 504c were braked together. An advantage of tighter pivot turns for both the 3-post configuration shown in FIG. 4 and the 4-post configuration shown in FIG. 5 is that the aircraft can maneuver more easily into tight airport spaces, which can decrease pilot workload and improve the efficiency of airport ramp operations.

Figure 6A:
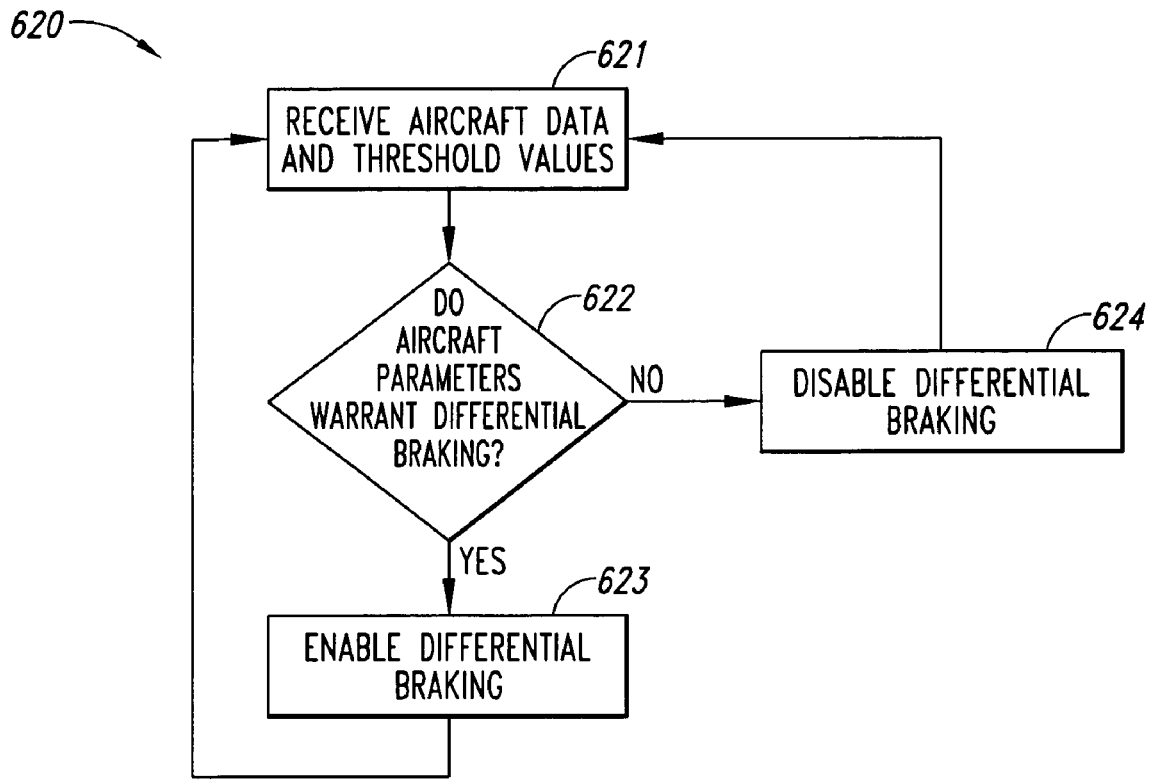
FIGS. 6A-6B are flow diagrams illustrating methods for differentially braking right and left landing gears in accordance with an embodiment of the invention.

FIG. 6A is a flow diagram illustrating a method 620 for selectively enabling or disabling differential braking. In this context, differential braking includes automatically changing the wheels or trucks to which brakes are applied in response to a change in aircraft parameters that goes beyond a pilot-initiated shift in commanded brake input. For example, differential braking can be used to correct for an environmental effect that would otherwise cause the aircraft to deviate from a commanded turn behavior. Block 621 includes receiving aircraft data or parameters and threshold values, and block 622 includes determining whether the aircraft parameters warrant differential braking. Once the determination has been made, differential braking can be enabled. If the aircraft parameters do not warrant differential braking, differential braking can be disabled (block 624).

The aircraft can have differential braking enabled or disabled as a default, depending upon the aircraft and/or expected use of the aircraft.

Figure 6B:
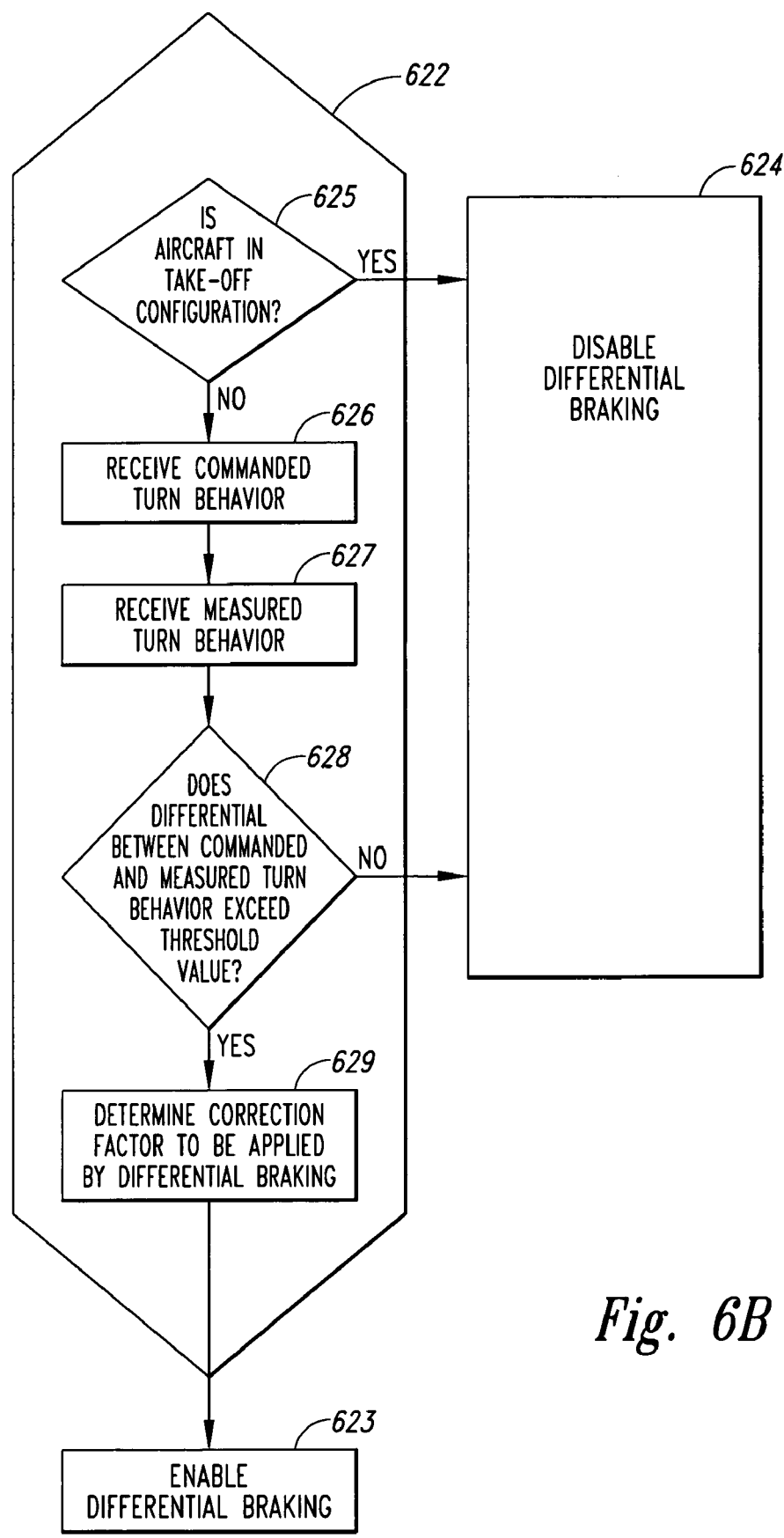

FIG. 6B is a flow diagram illustrating further aspects of an embodiment of process portion 622 described above with reference to FIG. 6A. In one aspect of this embodiment, process portion 622 (determining whether aircraft parameters warrant differential braking or not) can include first determining whether the aircraft is in a takeoff configuration (process portion 625). If the aircraft is in a takeoff configuration, differential braking will be disabled. If not, the process can include receiving a commanded turn behavior (process portion 626) and receiving a measured turn behavior (process portion 627). The commanded turn behavior can include a commanded yaw rate and lateral acceleration, determined from aircraft speed, any differential between left and right rudder pedal inputs, and any differential between left and right brake pedal inputs. The measured turn behavior can include a measured yaw rate and a measured lateral acceleration rate. Alternatively, wheel speed can be used to calculate the yaw rate and lateral acceleration rather than having these quantities measured directly. In either embodiment, process portion 628 can include determining whether a differential between the commanded turn behavior and the measured turn behavior exceeds a threshold value. This differential can be calculated as a quotient or as an arithmetic difference. If the differential does not exceed a threshold value, differential braking is disabled. If the differential does exceed a threshold value, process portion 629 can include determining a correction factor to be applied by differential braking. The correction factor can be based on or can be equal to the differential determined in process portion 628. In particular embodiments, the correction factor can be based on a lookup table or can be calculated based on a closed mathematic expression, or can be determined via an iterative process. In any of these embodiments, the differential braking effect can be enabled in process portion 623 to implement the correction factor determined in process portion 629.

In operation, the process described above with reference to FIGS. 6A-6B can be used to correct differences between a commanded turn behavior and an actual or measured turn behavior. Such differences may be created by environmental conditions external to the aircraft. For example, if during a turn one or more of the aircraft wheels encounters a slippery surface (e.g., liquid or ice) and begins to depart from the commanded yaw behavior, differential braking can be used to adjust the braking applied to the affected wheel and/or other wheels to correct the course of the aircraft back to the commanded turn behavior. An advantage of this arrangement is that it can improve the handling of the aircraft during turns on the ground, even if the surfaces on which the aircraft travels are less than ideal. A further advantage of at least one embodiment of the foregoing method is that it can automatically disable differential braking when the aircraft is configured for takeoff. This arrangement can prevent the inadvertent braking of the aircraft on a takeoff roll.

Figure 7:
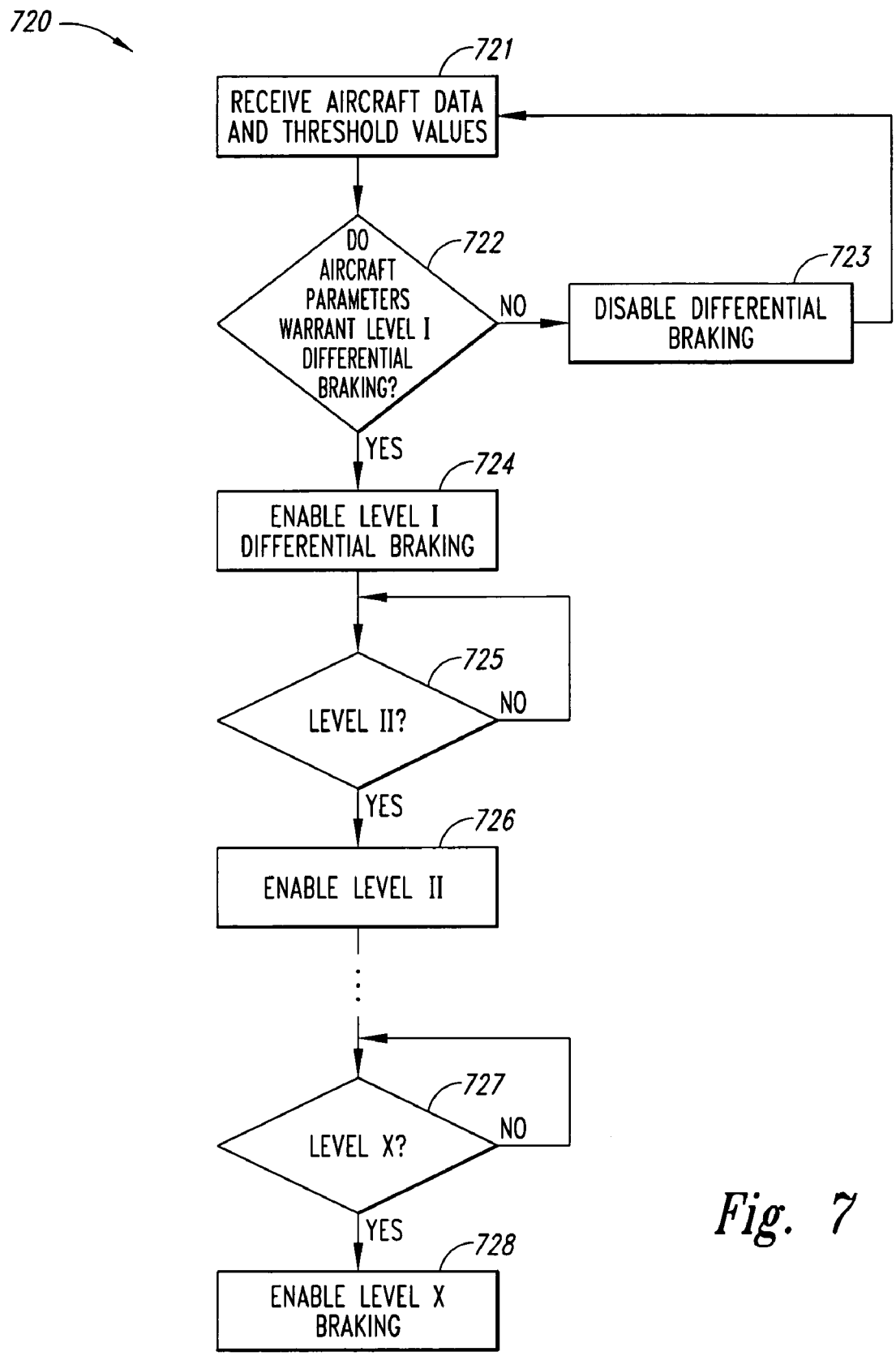
FIG. 7 is a flow diagram illustrating a process for changing brake effectiveness in a series of steps, in accordance with an embodiment of the invention.

FIG. 7 is a flow diagram illustrating a process 720 for incrementally increasing the amount of differential braking applied to an aircraft, in accordance with an embodiment of the invention. In process portion 721, the process can include receiving aircraft data or parameters and threshold values. In process portion 722, the process can include determining whether the aircraft parameters warrant level I differential braking. For example, if the aircraft speed is below a threshold level, but not so low as to allow full differential braking, the process can include enabling level I differential braking (process portion 724). If not, differential braking can be disabled (process portion 723). In block 725, the process can include determining whether the aircraft parameters warrant level II differential braking. For example, as the aircraft speed decreases, the disparity between the braking force for the inside wheels and the outside wheels of the landing gear can be increased and/or the disparity between the braking force applied to different gears can be increased (e.g., by enabling level II braking as identified in block 726). This process can be repeated any number of times, as indicated by ellipsis in FIG. 7 and by process blocks 727 (determining whether aircraft parameters warrant level "X" differential braking) and 728 (enabling level "X" braking).

One feature of an embodiment described above with reference to FIG. 7 is that the system can automatically determine when the aircraft is ready for additional differential braking by continually checking updated aircraft data against a range of threshold values. An advantage of this arrangement is that, as the aircraft conditions warrant increased (or decreased) differential braking, the appropriate differential braking can be automatically provided. Accordingly, the pilot need not reinitiate a braking command in order to achieve additional differential braking affects. Conversely, some pilots may not wish to have the differential braking force increased while maintaining the same brake input command. Accordingly, in other embodiments, the system can require that the pilot release the brake and reapply the brake before engaging an enhanced level of differential braking.

Figure 8:
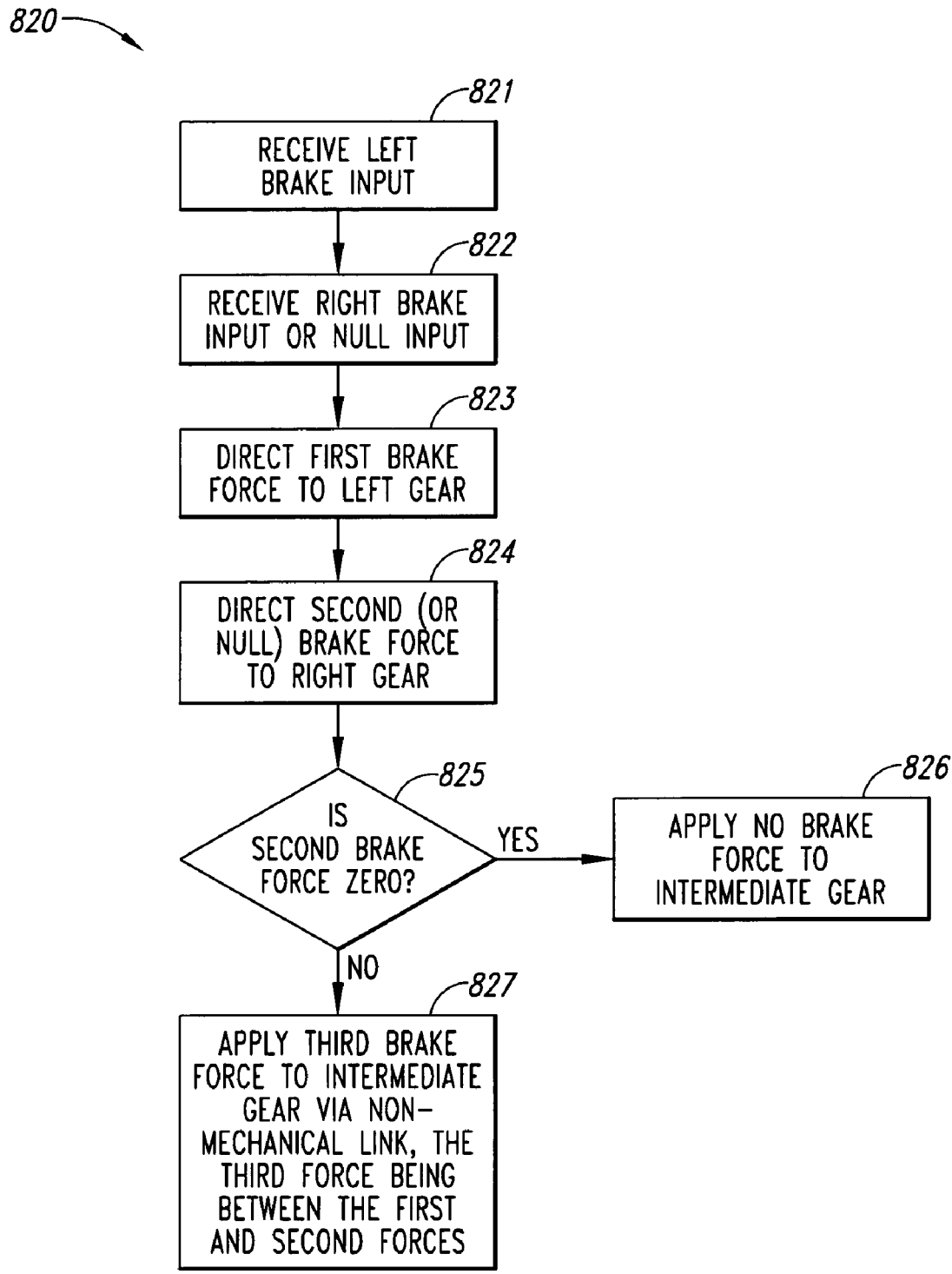
FIG. 8 is a flow diagram illustrating a method for applying a braking force to intermediate aircraft landing gear in accordance with another embodiment of the invention.

FIG. 8 illustrates a process 820 for providing intermediate gear braking in accordance with yet another embodiment of the invention. This process can be used in conjunction with the intermediate gear braking processes described above with reference to FIGS. 2-5, and/or in conjunction with the differential braking arrangement described above with reference to FIGS. 6A-7. The process 820 can include receiving a left brake input (process portion 821) and receiving a right brake input or null input (process portion 822). The process can further include directing a first brake force to the left gear of the aircraft (process portion 823) and directing a second brake force to the right gear (process portion 824). If the right brake input is a null value, then no brake force is directed to the right gear. The process then includes determining whether or not the second brake force is zero (process portion 825). If it is, the process includes applying no brake force to the intermediate gear of the aircraft (process portion 826). If the second brake force is non-zero, then the process includes applying a third brake force to the intermediate gear via a non-mechanical link, with the third force having a value between that of the first and second forces. Accordingly, the intermediate gear can provide additional braking force for the aircraft and, by being braked at a value between the brake forces applied to the left and right gear, can have predictable or non-existent effect on the turning behavior of the aircraft. The non-mechanical link (e.g., an electrical, optical or other fly-by-wire link) can weigh less than existing mechanical links, improving the operability and cost effectiveness of the aircraft on which it is installed.

Figure 9A:
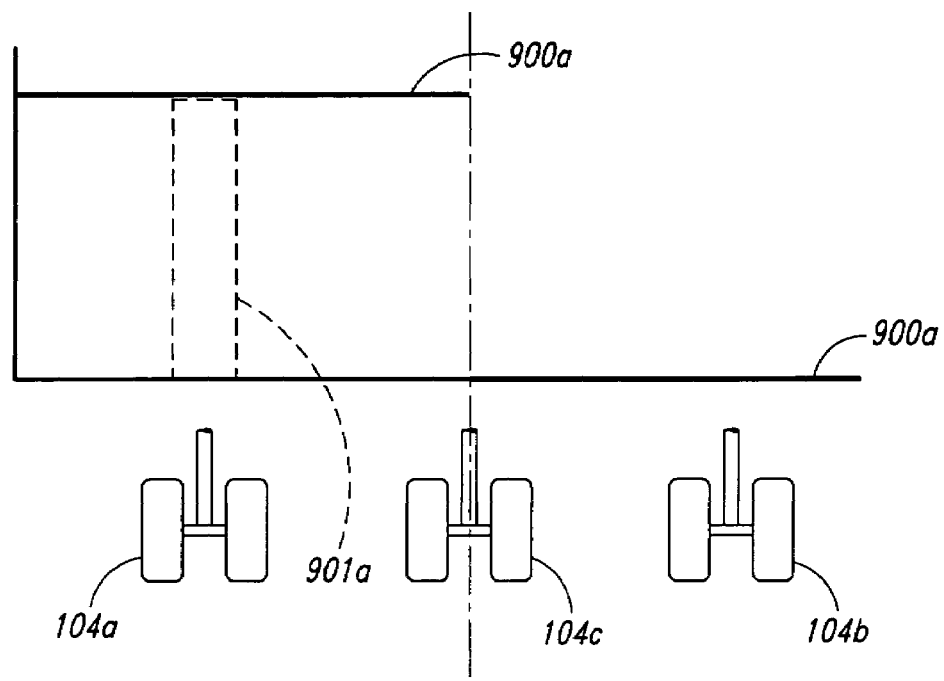
FIGS. 9A-9B illustrate applied braking forces for a 3-post landing gear configuration braked in accordance with an embodiment of the method shown in FIG. 8.
Figure 9B:
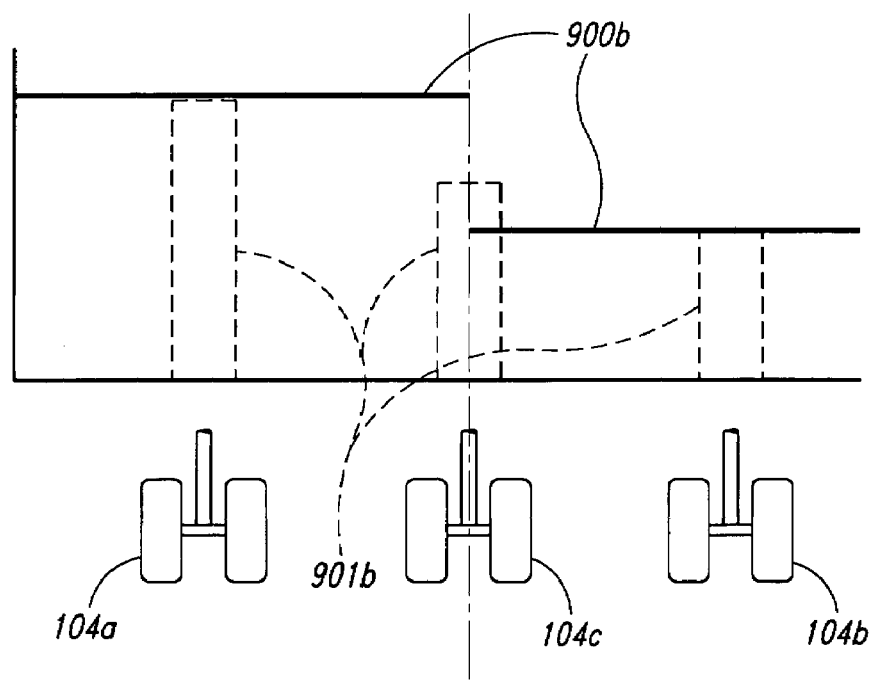

FIGS. 9A-9B illustrate one manner in which the foregoing method described with reference to FIG. 8 can be carried out on an aircraft having a 3-post main landing gear configuration. Beginning with FIG. 9A, solid lines 900a indicate the commanded brake input for left and right sides of the aircraft (e.g., a non-zero commanded brake input for the left side of the aircraft, and no commanded brake input for the right side of the aircraft). Dashed lines 901a indicate the amount of braking applied to each of the three gears 104a, 104b and 104c. Because only a left brake command is received by the system, brakes are applied to the left gear 104a only, and not to the right gear 104b or the intermediate gear 104c. The brakes can be applied evenly to all wheels of the left gear 104a, as shown in FIG. 9A, or the brakes can be applied differentially to the right and left wheels of the left gear 104a.

FIG. 9B illustrates the braking behavior when the right commanded brake input is less than the left commanded brake input, but has a non-zero value (lines 900b). In this case, the right gear 104b receives a brake force commensurate with the input brake command, and the intermediate gear 104c receives a brake force that is between the force applied to the right gear 104b and the left gear 104a (lines 901b). As described above, braking can optionally be applied differentially to different wheels of the same gear.

Figure 10A:
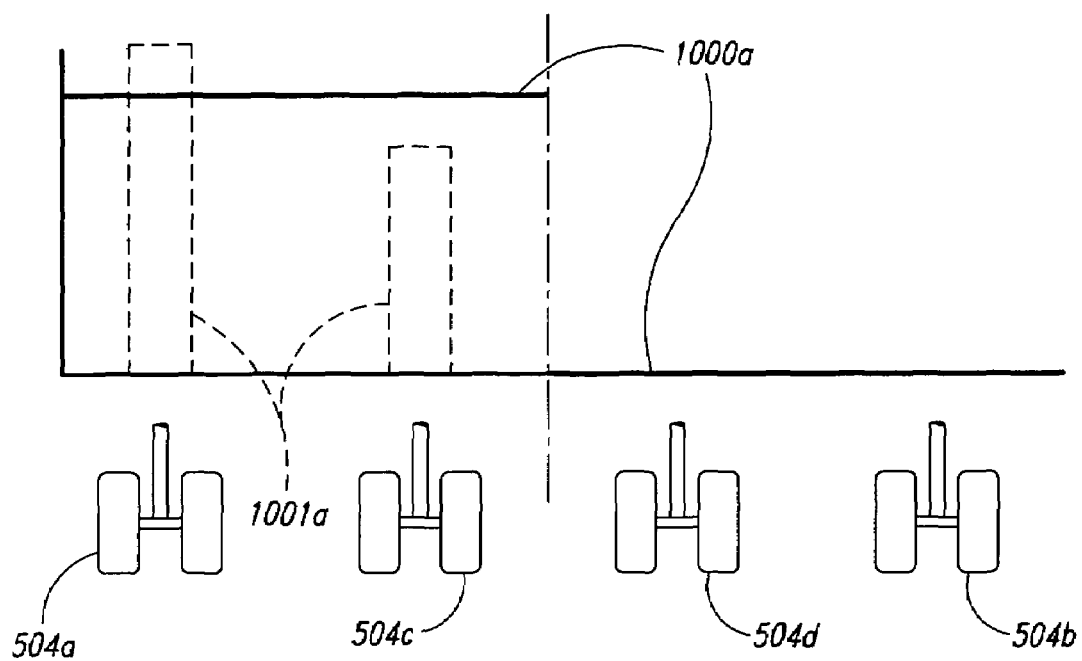
FIGS. 10A-10B illustrate applied braking forces for a 4-post landing gear configuration, braked in accordance with an embodiment of the method shown in FIG. 8.
Figure 10B:
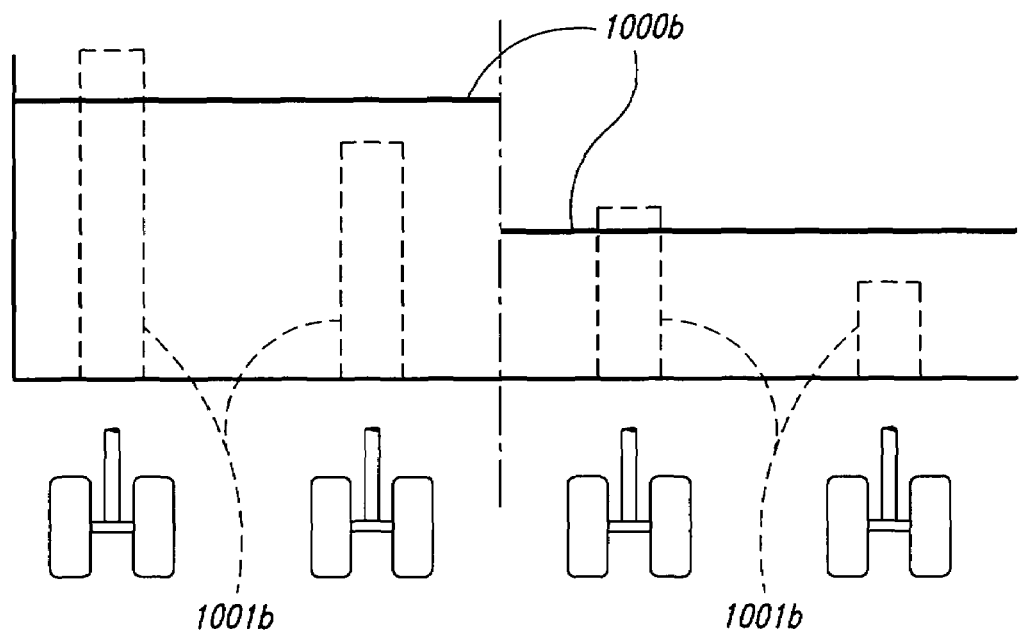

FIGS. 10A-10B illustrate aspects of the foregoing method applied to an aircraft having a 4-post main landing gear configuration. FIG. 10A illustrates an arrangement in which a non-zero brake force input is commanded for the left side of the aircraft, and a zero brake force input (e.g. a null input) is commanded for the right side of the aircraft, as indicated by solid lines 1000a. Dashed lines 1001a illustrate the force applied to each of the landing gear trucks. In a particular aspect of this embodiment, a force corresponding to a value greater than the input brake value is applied to the left gear 504a, and a force less than the input brake value is applied to the left intermediate gear 504c. This can enhance the rate at which the aircraft executes a left turn. No brake force is applied to either the right gear 504b or the right intermediate gear 504d because no right brake command was input.

FIG. 10B illustrates the situation when the commanded right brake force is non-zero (lines 1000b). In this case, the forces applied to the left gear 504a and the left intermediate gear 504c remain unchanged. The force applied to the right gear 504b is at a level below that provided by the commanded right brake input, and the force applied to the right intermediate gear 504d is above the commanded right brake input force (lines 1001b). Accordingly, the braking force for a left turn can be applied in a generally continuously staggered fashion across all the main landing gear posts. As will be clear to one of ordinary skill in the art, the behavior described above with reference to FIGS. 9A-10B can be similar (but with the opposite sense) when a right turn is commanded.

One feature of embodiments of the methods and systems described above with reference to FIGS. 8-10B is that they can employ the intermediate gear during braking, even when the aircraft is commanded to simultaneously execute a turn. An advantage of this arrangement is that it can increase the braking effectiveness of the aircraft. Accordingly, these systems can methods can reduce the stopping distance of the aircraft during taxi maneuvers.

From the foregoing, it will be appreciated that specific embodiments of the invention have been described herein for purposes of illustration, but that various modifications may be made without deviating from the invention. For example, aspects of the invention described in the context of particular embodiments may be combined or eliminated in other embodiments. A further particular example includes applying differential braking as described with reference to FIGS. 6A-7 in combination with the braking arrangements described with reference to FIGS. 1A-5 and/or FIGS. 8-10B. Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

We claim:

1. A braking system for an aircraft, comprising:
a controller operatively coupleable with a non-mechanical link to a leftmost landing gear of an aircraft, a rightmost landing gear of the aircraft, and at least one intermediate landing gear of the aircraft positioned aft of a nose wheel of the aircraft between the leftmost landing gear and the rightmost landing gear, the at least one intermediate landing gear including a left intermediate landing gear and a right intermediate landing gear, the controller being configured to direct a first braking force to wheels of the leftmost landing gear during a left turn, and no braking force or a second braking force less than the first braking force to wheels of the rightmost landing gear during the left turn, a third braking force applied to the right intermediate gear, and a fourth braking force less than the first braking force to the right intermediate gear, wherein the third braking force is:
  (a) less than the first braking force and greater than the second braking force if the second braking force is non-zero; and
  (b) zero if the second braking force is zero.

2. The system of claim 1 wherein the controller includes a computer-readable medium configured to direct the braking forces.

3. The system of claim 1 wherein the controller is configured to:
receive a first signal corresponding to a left brake command;
receive a second signal corresponding to a right brake command; and
direct a third braking force less than the first braking force and greater than zero or the second braking force only when the first brake command and the second brake command are below a first threshold level, and a difference between the first and second brake commands is below a second threshold level.

4. The braking system of claim 1 wherein the controller is configured to:
receive a first signal corresponding to a commanded turn behavior;
receive a second signal corresponding to an actual turn behavior;
determine an error value based on the first and second signals; and
in response to the error value exceeding a threshold value, direct a change in braking force applied to at least one of the leftmost and rightmost landing gear.

5. The system of claim 4 wherein the controller is configured to receive a third signal corresponding to a configuration of the aircraft, and wherein the controller is configured not to direct the change in braking force when the third signal corresponds to the aircraft being in a landing configuration.

6. The system of claim 4 wherein the commanded turn behavior includes a commanded yaw rate and a commanded lateral acceleration, and wherein the actual turn behavior corresponds to a measured yaw rate and a measured lateral acceleration.

7. The system of claim 4 wherein the commanded turn behavior includes a commanded yaw rate and a commanded lateral acceleration based on aircraft speed, rudder pedal deflection and brake pedal differential.

8. The system of claim 4 wherein the controller includes a computer-readable medium configured to direct the braking forces.

9. The system of claim 4 wherein directing a change in braking force applied to at least one of the leftmost and rightmost landing gear includes at least partially reducing the difference between the commanded turn behavior and the actual turn behavior.

10. A method for braking an aircraft, comprising:
receiving a first brake command corresponding to a brake input for the left side of the aircraft,
receiving a second brake command corresponding to a brake input for the right side of the aircraft, the second brake command being less than the first brake command;
directing braking inputs, via a non-mechanical link, to a leftmost landing gear of an aircraft, a rightmost landing gear of the aircraft and at least one intermediate landing gear of the aircraft, including a left intermediate gear and a right intermediate gear, both positioned aft of a nose wheel of the aircraft between the leftmost landing gear and the rightmost landing gear, by:
directing a first braking force to wheels of the leftmost landing gear during a left turn;
directing no braking force or a second braking force less than the first braking force to wheels of the rightmost landing gear during the left turn;
directing a third braking force to the left intermediate gear, the third braking force being:
(a) less than the first braking force and greater than the second braking force if the second braking force is non-zero; and
(b) zero if the second braking force is zero; and
directing a fourth braking force greater than the second braking force to the right intermediate landing gear.

11. The method of claim 10, further comprising:
receiving a first signal corresponding to a commanded turn behavior for the aircraft;
receiving a second signal corresponding to an actual turn behavior of the aircraft;
determining an error value based on the first and second signals; and
in response to the error value exceeding a threshold value, automatically directing a change in braking force applied to at least one of the leftmost and rightmost landing gear.

12. The method of claim 11, further comprising:
receiving a third signal corresponding to a configuration of the aircraft; and
not directing the change in braking force when the third signal corresponds to the aircraft being in a landing configuration.

13. The method of claim 11 wherein the commanded turn behavior includes a commanded yaw rate and a commanded lateral acceleration, and wherein the actual turn behavior corresponds to a measured yaw rate and a measured lateral acceleration.

14. The method of claim 11 wherein directing a change in braking force applied to at least one of the left and right aircraft brakes includes at least partially reducing the difference between the commanded turn behavior and the actual turn behavior.

15. A braking system for an aircraft, comprising:
a controller operatively coupleable with a non-mechanical link to a leftmost landing gear of an aircraft, a rightmost landing gear of the aircraft, and at least one intermediate landing gear of the aircraft positioned aft of a nose wheel of the aircraft between the leftmost landing gear and the rightmost landing gear, the at least one intermediate landing gear including a left intermediate landing gear and a right intermediate landing gear, the controller being configured to receive a first brake command corresponding to a brake input for the left side of the aircraft, and a second brake command corresponding to a brake input for the right side of the aircraft, the second brake command being less than the first brake command, the controller further being configured to direct a first braking force to wheels of the leftmost landing gear during a left turn, and no braking force or a second braking force less than the first braking force to wheels of the rightmost landing gear during the left turn, and a third braking force applied to the left intermediate gear and a fourth braking force lower than the second brake command to the rightmost landing gear, wherein the third braking force is:
(a) less than the first braking force and greater than the second braking force if the second braking force is non-zero; and
(b) zero if the second braking force is zero.

16. A braking system for an aircraft, comprising:
a controller operatively coupleable with a non-mechanical link to a leftmost landing gear of an aircraft, a rightmost landing gear of the aircraft, and at least one intermediate landing gear of the aircraft positioned aft of a nose wheel of the aircraft between the leftmost landing gear and the rightmost landing gear, the at least one landing gear including a left intermediate landing gear and a right intermediate landing gear, the controller being configured to receive a first brake command corresponding to a brake input for the left side of the aircraft, and a second brake command corresponding to a brake input for the right side of the aircraft, the second brake command being less than the first brake command, and wherein the controller is configured to direct a first braking force higher than the first brake command to wheels of the leftmost landing gear during a left turn, no braking force or a second braking force less than the first braking force and less than the second brake command to wheels of the rightmost landing gear during the left turn, a third braking force to the left intermediate gear, and a fourth braking force to the right intermediate landing gear, the fourth braking force being greater than the second brake command, and wherein the third braking force is:
(a) less than the first braking force and greater than the second braking force if the second braking force is non-zero;
(b) zero if the second braking force is zero; and
(c) lower than the first brake command.

17. A method for braking an aircraft, comprising:
receiving a first brake command corresponding to a brake input for the left side of the aircraft;
receiving a second brake command corresponding to a brake input for the right side of the aircraft, the second brake command being less than the first brake command;

directing braking inputs, via a non-mechanical link, to a leftmost landing gear of an aircraft, a rightmost landing gear of the aircraft and an intermediate landing gear of the aircraft, including a left intermediate gear and a right intermediate gear, both positioned aft of a nose wheel of the aircraft between the leftmost landing gear and the rightmost landing gear, by:
  directing a first braking force higher than the first brake command to wheels of the leftmost landing gear during a left turn;
  directing no braking force or a second braking force less than the first braking force to wheels of the rightmost landing gear during the left turn;
  directing a third braking force to the left intermediate gear, the third braking force being:
    (a) less than the first braking force and greater than the second braking force if the second braking force is non-zero; and
    (b) zero if the second braking force is zero; and
  directing a fourth braking force to the right intermediate gear, wherein the first braking force is higher than the first brake command, the third braking force is less than the first brake command, the fourth braking force is higher than the second brake command, and the second braking force is less than the second brake command.

* * * * *

UNITED STATES PATENT AND TRADEMARK OFFICE
CERTIFICATE OF CORRECTION

| | |
|---|---|
| PATENT NO. | : 7,300,020 B2 |
| APPLICATION NO. | : 11/067053 |
| DATED | : November 27, 2007 |
| INVENTOR(S) | : Steiner et al. |

Page 1 of 1

It is certified that error appears in the above-identified patent and that said Letters Patent is hereby corrected as shown below:

Title Page 2, in field (56), under "Other Publications", in column 2, line 9, delete "Compsites," and insert -- Composite, --, therefor.

Title Page 2, in field (56), under "Other Publications", in column 2, line 17, delete "Elseiver" and insert -- Elsevier --, therefor.

Signed and Sealed this

Twenty-ninth Day of July, 2008

JON W. DUDAS
*Director of the United States Patent and Trademark Office*